Aug. 30, 1932.   R. A. GOEPFRICH   1,874,963
BRAKE
Filed July 26, 1929
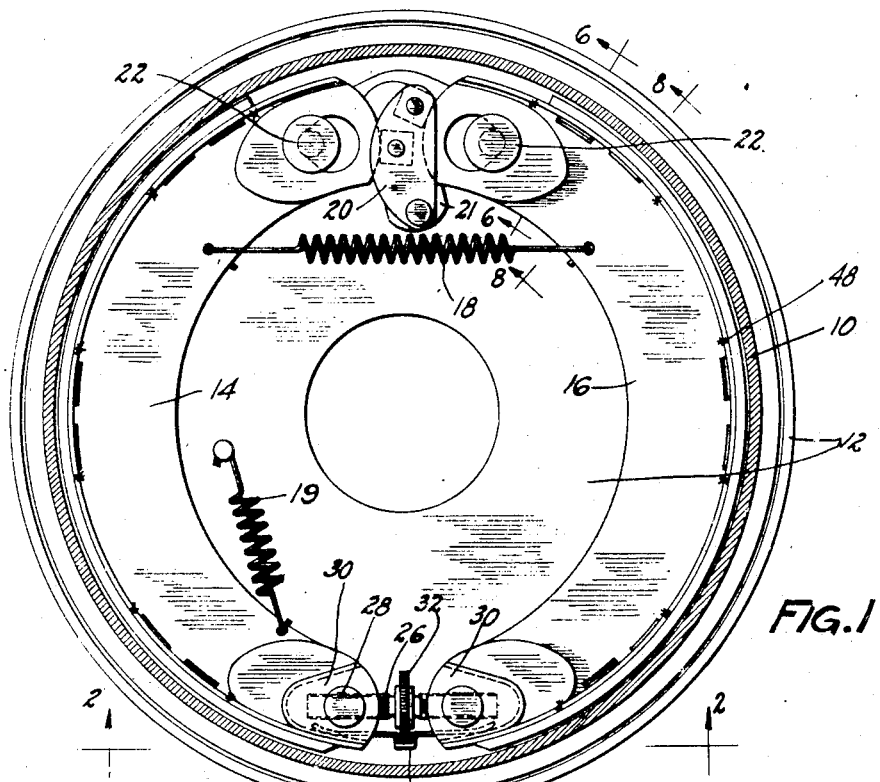
FIG.1
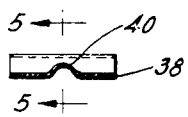
FIG.4
FIG.5
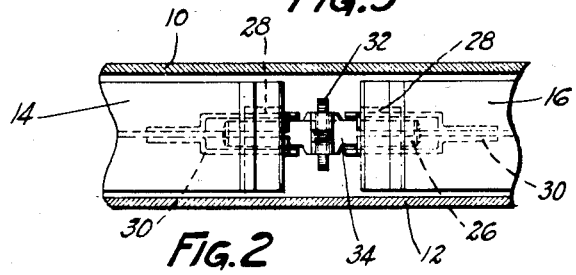
FIG.2
FIG.3
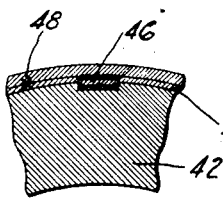
FIG.7
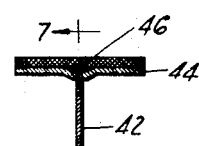
FIG.6
FIG.8
FIG.9
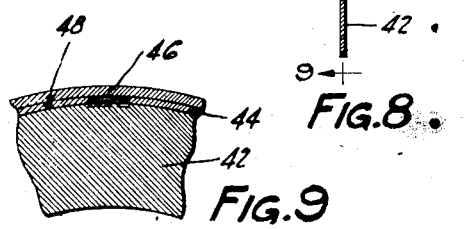
INVENTOR
RUDOLPH A. GOEPFRICH
BY
H.O. Clayton
ATTORNEY Patented Aug. 30, 1932

1,874,963

UNITED STATES PATENT OFFICE

RUDOLPH A. GOEPFRICH, OF SOUTH BEND, INDIANA, ASSIGNOR TO BENDIX BRAKE COMPANY, OF SOUTH BEND, INDIANA, A CORPORATION OF ILLINOIS

BRAKE

Application filed July 26, 1929. Serial No. 381,122.

This invention relates to brakes and is illustrated as embodied in a internal expanding brake for an automobile. An object of the invention is to provide a simple device, preferably in the form of a stamping of spring steel for yieldingly retaining the adjusting member of a floating joint connecting the two shoes of a brake friction means. The stamping may be preformed in such a manner that when inserted between parts of the floating joint the former is bent and thereby placed under tension to contact with an adjustable part of the joint.

A feature of the invention resides in a resilient clip having a transverse channel and a raised portion in the channel arranged to engage the adjusting member of the friction element of a brake.

The above and other objects and features of the invention, including various novel and desirable details of construction, will be apparent from the following description of the illustrative embodiments shown in the accompanying drawing, in which:

Figure 1 is a vertical section through the brake just inside the head of the brake drum and showing the brake shoes in side elevation;

Figure 2 is a partial section taken on the line 2—2 of Figure 1 disclosing partly in plan my novel holding clip and parts of the floating pivot in dotted lines;

Figure 3 is an enlarged view of the novel spring clip indicating in dotted lines the tensioned position of the clip when in operative position;

Figure 4 is a section taken on the line 4—4 of Figure 3 indicating in detail the center trough of the spring clip;

Figure 5 is a section through the clip taken on the line 5—5 of Figure 4;

Figure 6 is a transverse section through one of the brake shoes taken on the line 6—6 of Figure 1 showing my novel means for obviating relative longitudinal movement of the parts of the shoe;

Figure 7 is a partial longitudinal section through the shoe taken on the line 7—7 of Figure 6;

Figure 8 is a transverse section taken on the line 8—8 of Figure 1 indicating the means for positioning and retaining the web laterally of the rim; and Figure 9 is a partial longitudinal section of the shoe taken on the line 9—9 of Figure 8.

The illustrated brake includes a rotatable drum 10 at the open side of which is a support such as a backing plate 12 and within which are arranged connected shoes 14 and 16, duplicates of each other and applied, against the resistance of return springs 18 and 19, by means such as a floating cam lever 20 actuated by a crank arm 21 on the end of a cam shaft (not shown) journaled in the backing plate 12. The shoes of the brake are so arranged that when the drum is turning clockwise, the shoe 14 anchors against one of the two anchors 22 and when the drum is turning counterclockwise the shoe 16 anchors against the other of the two anchors 22. The joint between the shoes, which floats as the brake is applied and released, consists of a right and left threaded bolt 26 threaded into transversely extending pins 28 journaled in semi-cylindrical plates 30 secured on either side of the web of the shoe. This construction does not of itself form a part of my present invention.

According to one phase of the present invention, the bolt 26 adjustable to compensate for lining wear of the brake is provided centrally with a ratchet wheel 32 and is retained in its position of adjustment with respect to the pins 28 by a novel spring steel stamping 34 disclosed in detail in Figures 3, 4 and 5. This clamp is preferably stamped from high carbon spring steel and is preferably preformed, as indicated in full lines in Figure 3 and provided at its central area with a recess or embossed portion 38 extending across the clamp and which fits around the ratchet wheel 32. Centrally of the recess or trough 38 there may be provided an embossment 40 adapted to fit between two of the teeth of the ratchet wheel.

The novel clamp is assembled by slipping the same at its ends into the grooves in the ends of the shoes formed by the plates 30, the ratchet wheel 32 fitting within trough 38 and pressing the same into the form indicated in dotted lines in Figure 3 and full lines in Figure 1. The embossment 40 fits between two of the teeth of the wheel and the clamp thus tensioned serves the dual function of both retaining the adjustment of the bolt and obviating play in the parts of the joint.

According to another feature of my invention disclosed in detail in Figures 6 and 7, the web 42 and rim 44 of each of the interchangeable brake shoes may be connected by spaced embossments 46 protruding from the under side of the rim and fitting within correspondingly shaped recesses in the periphery of the web. As disclosed in Figures 8 and 9, relative lateral movement of the rim and web may be obviated by slotting certain of the embossments 46 to accommodate the uninterrupted peripheral surface of the web.

By the securing means thus described, both lateral and longitudinal relative motion between the web and rim of the shoe are obviated and the assembly of these parts is facilitated by this fastening structure, the parts serving as positioning or locating elements. The web and rim are preferably further secured together by spot welded areas 48, as indicated in the figures of the drawing.

The structure illustrated in Figures 6, 7, 8 and 9 constitutes the subject matter of a divisional application filed December 21, 1931, Serial No. 582,431.

While one illustrative embodiment of the invention has been described in detail, it is not my intention to limit the scope of the invention to that particular embodiment or otherwise than by the terms of the appended claims.

I claim:

1. Clamp means for a joint comprising a resilient sheet metal member recessed at its center to provide a trough, said trough provided at its center with an upwardly extending embossed portion.

2. Clamp means for a joint connecting a pair of brake shoes comprising a resilient sheet metal member of predetermined curvature and recessed centrally thereof to provide a trough, said member being adapted to be bent to hold the parts of the joint together.

3. A brake comprising, in combination, friction elements connected by a floating joint, said joint comprising an adjustable member and means for retaining said adjustment comprising a spring clip having its ends inserted within the ends of the friction members and its central portion bent by a part of the joint to retain the latter in operative position.

4. A clip comprising a leaf spring having a channel and a raised surface in the channel.

5. A clip comprising a leaf spring having a transverse channel and a raised portion in the channel.

6. A clip comprising a leaf spring having curved end portions and a transversely arranged channel together with a raised portion in the channel.

7. A clip comprising a leaf spring having a transverse channel arranged centrally of its length and upturned end portions and a raised portion positioned transversely in the channel.

In testimony whereof, I have hereunto signed my name.

RUDOLPH A. GOEPFRICH.

DISCLAIMER 1,874,963.—*Rudolph A. Goepfrich,* South Bend, Ind. BRAKE. Patent dated August 30, 1932. Disclaimer filed July 5, 1935, by *Rudolph A. Goepfrich* and *Bendix Brake Company.*

Hereby enter this disclaimer to that part of the claim in said specification which is in the following words, to wit:

"1. Clamp means for a joint comprising a resilient sheet metal member recessed at its center to provide a trough, said trough provided at its center with an upwardly extending embossed portion."

"4. A clip comprising a leaf spring having a channel and a raised surface in the channel.

"5. A clip comprising a leaf spring having a transverse channel and a raised portion in the channel."

[*Official Gazette July 30, 1935.*]